United States Patent [19]

Lin

[11] Patent Number: 5,775,514

[45] Date of Patent: Jul. 7, 1998

[54] SCREW BAND

[76] Inventor: Jack Lin, 9F3R, No.210, Chung Hsueh Rd., Tainan, Taiwan

[21] Appl. No.: 810,319

[22] Filed: Feb. 28, 1997

[51] Int. Cl.$^6$ .................................................. B65D 85/24
[52] U.S. Cl. .............................. 206/347; 206/343; 206/345
[58] Field of Search .................................... 206/343, 345, 206/346, 347, 338, 306

[56] References Cited

U.S. PATENT DOCUMENTS

| | | | |
|---|---|---|---|
| 4,047,611 | 9/1977 | Damratowski | 206/347 |
| 4,061,226 | 12/1977 | Essen | 206/306 |
| 4,718,551 | 1/1988 | Witledge | 206/343 |
| 4,955,476 | 9/1990 | Nakata et al. | 206/347 |
| 5,522,687 | 6/1996 | Chen | 206/347 |
| 5,544,746 | 8/1996 | Dohi | 206/346 |

*Primary Examiner*—David T. Fidei
*Attorney, Agent, or Firm*—Pro-Techtor Inter-national Services

[57] ABSTRACT

A screw band can hold screws of different diameters, having a body of any length provided with notches in two longitudinal sides for the band to be moved by a screw driving tool. The band has plural screw holes respectively defined by an annular wall extending down from the band. The annular wall has plural small notches for screws to be driven through the screw holes smoothly. Plural valves extend inward from an inner surface of the annular wall for supporting a screw planted in each screw hole. The valves may be any type and may bend to form a contact-with-each-other condition or a non-contact-with-each-other condition and to produce elasticity for securely supporting a screw of different diameters.

4 Claims, 11 Drawing Sheets

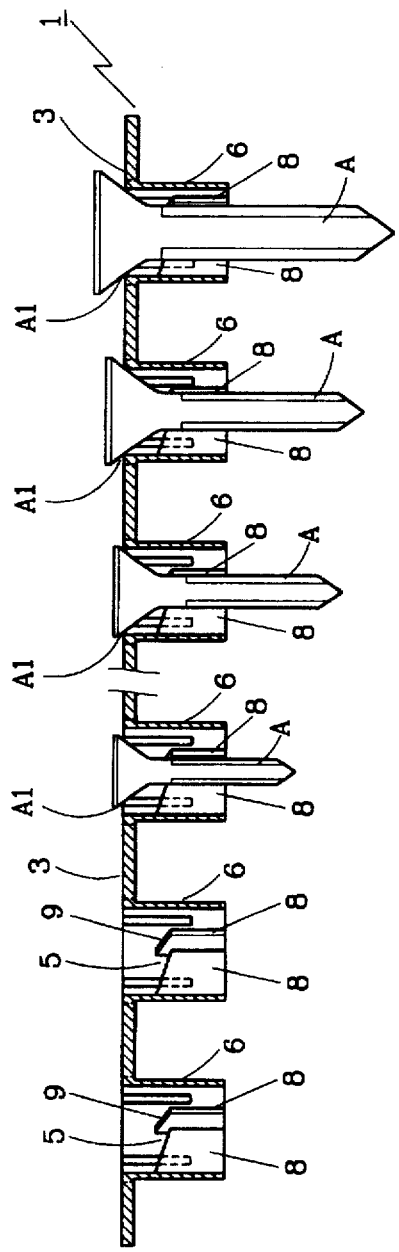
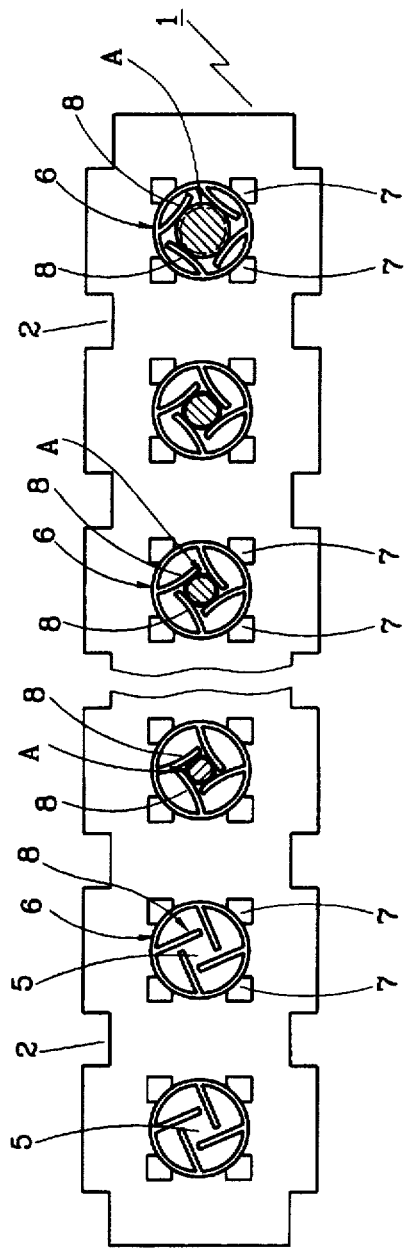
Fig 5
Fig 6

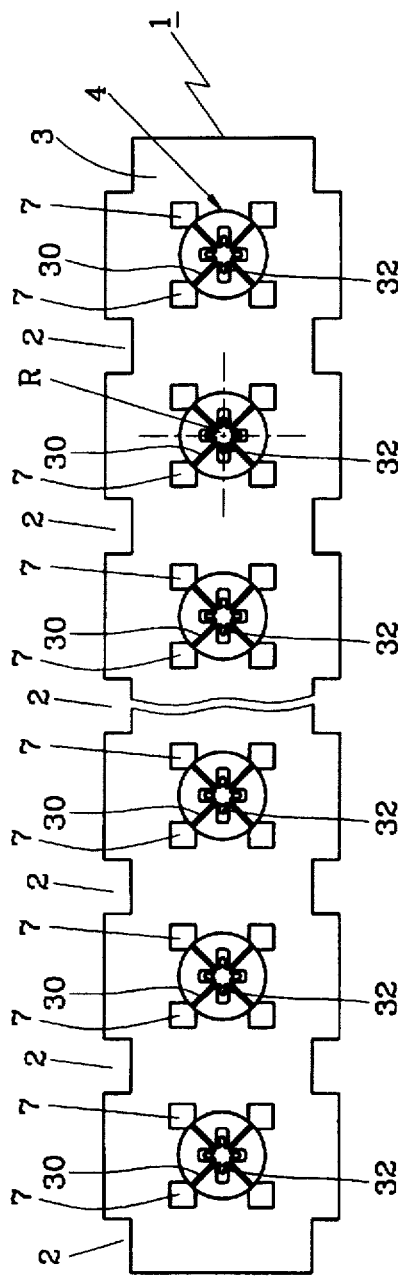 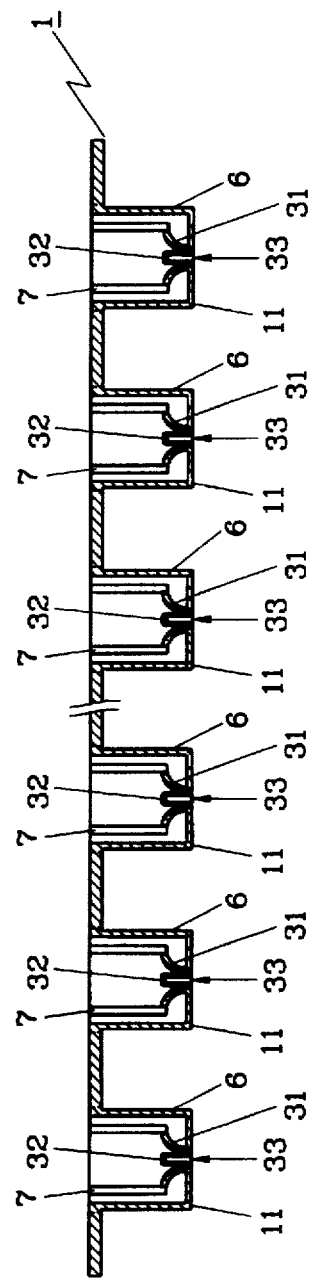
Fig 12
Fig 13

SCREW BAND

BACKGROUND OF THE INVENTION

This invention concerns a screw band, particularly possible to carry screws of different diameters in a regularly arranged condition.

A first known conventional screw band shown in FIG. 1 includes a plurality of screw holes P respectively with an annular wall P1 extending down for defining each screw hole P. The inner diameter P2 of each screw hole P is definite, only usable for one kind of screws of the same diameter. So screws of different diameters should be held in screw holes of different diameters, consequently different screw bands have to be prepared, resulting in high cost.

A second known conventional screw band shown in FIG. 2 includes a plurality of screw holes P of a cone-shaped portion and a cylindrical portion, and its diameter is also definite as the first conventional screw band, usable for only one kind of screws as the first one.

SUMMARY OF THE INVENTION

The purpose of the invention is to offer a screw band of an improved structure so as to hold screws of different diameters.

The invention has the following features.

1. It has two or more vanes, which are provided in each annular wall of plural screw holes formed in a screw band. The vanes extend inward and produce elasticity for securely supporting a screw when pressed and bent by the screw planted in each screw hole, and forming a contact-with-each-other condition or a non-contact-with-each-other condition.
2. The valve vanes are arranged in a clockwise direction or a counter clockwise direction.
3. The annular wall is shaped as any form.
4. The vanes are shaped as straight plates or any form.
5. Each vanes has a cone-shaped recess in a sloped surface or curved surface formed in an upper portion so as to support the neck of a screw.
6. Each screw hole of the screw band has a through hole defined by an annular wall extending down, and its inner surface is provided with two or more vanes; which will bend downward to form a clamp space of a diameter changeable for supporting screws of different diameters when a screw is planted therein.
7. All the vanes in each annular wall extends to the center of the hole in a vertical or non-vertical direction from an inner surface, arranged in a balanced position or an unbalanced position.
8. All the vanes in each screw hole may extend upward from the lower end of the annular wall.
9. The vanes in each screw hole may have any shape.
10. The vanes consist of plural round curved ones, and the round curved valves may extend from the annular wall of the screw hole, and/or extend from the lower end of the annular wall.

BRIEF DESCRIPTION OF DRAWINGS

This invention will be better understood by referring to the accompanying drawings, wherein:

FIG. 5 is a cross-sectional view of the first preferred embodiment of a screw band in the present invention, carrying screws of different diameters;

FIG. 6 is a bottom view of the first preferred embodiment of a screw band in the present invention; and, FIG. 7 is a perspective view of the first preferred embodiment of a screw band in the present invention;

FIG. 12 is an upper view of a third preferred embodiment of a screw band in the present invention;

FIG. 13 is a cross-sectional view of the third preferred embodiment of a screw band in the present invention;

DESCRIPTION OF THE PREFERRED EMBODIMENT

Figure 2:
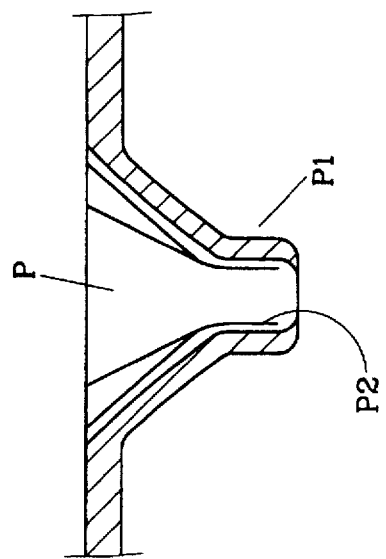
FIG. 2 is a cross-sectional view of a second known conventional screw band.
Figure 1:
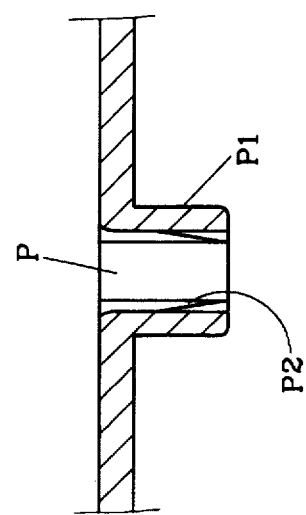
FIG. 1 is a cross-sectional view of a first known conventional screw band.
Figure 3:
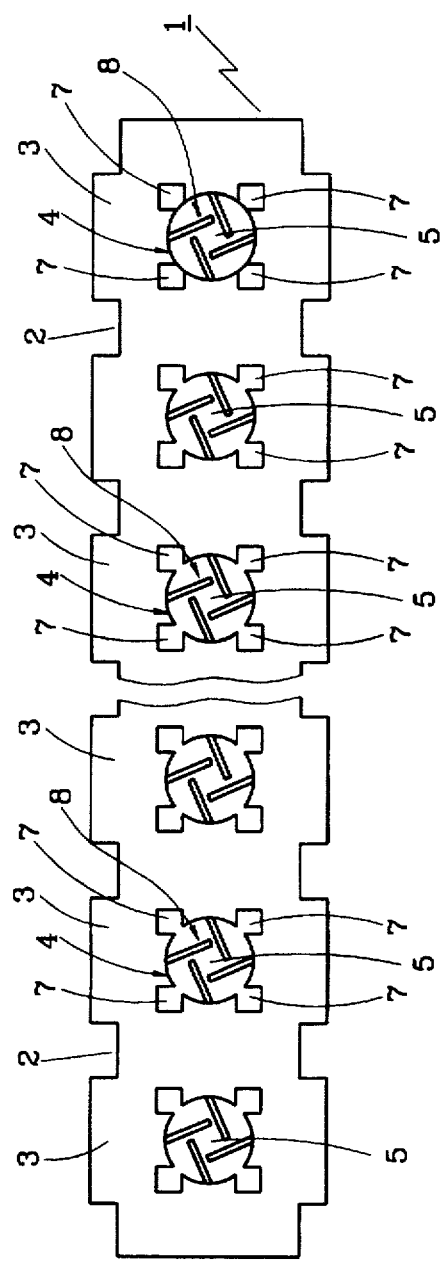
FIG. 3 is an upper view of a first preferred embodiment of a screw band in the present invention.
Figure 4:
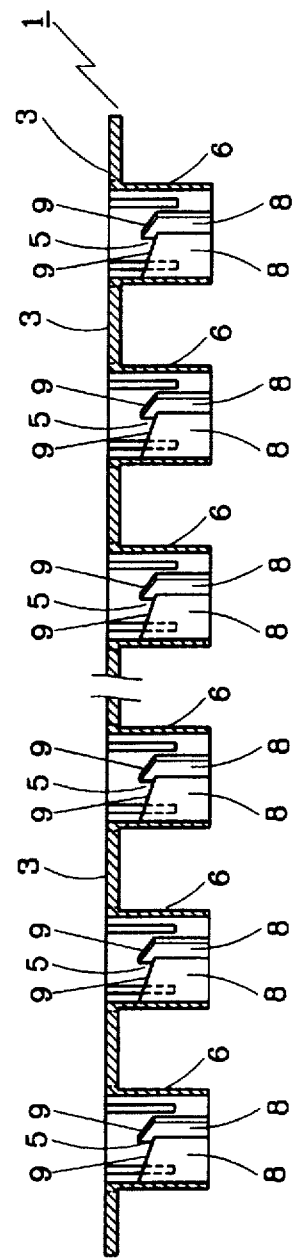
FIG. 4 is a cross-sectional view of the first preferred embodiment of a screw band in the present invention.
Figure 7:
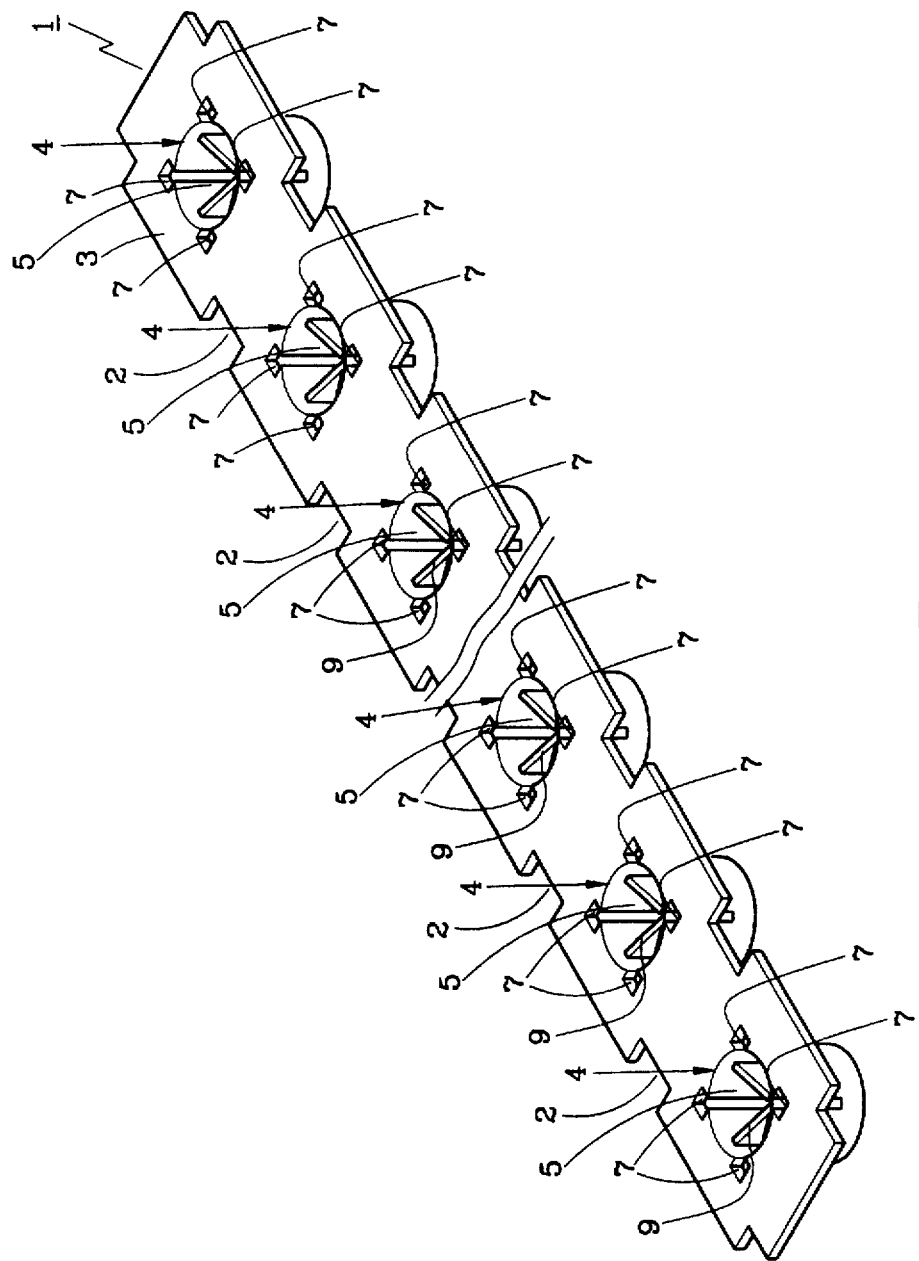
Figure 8:
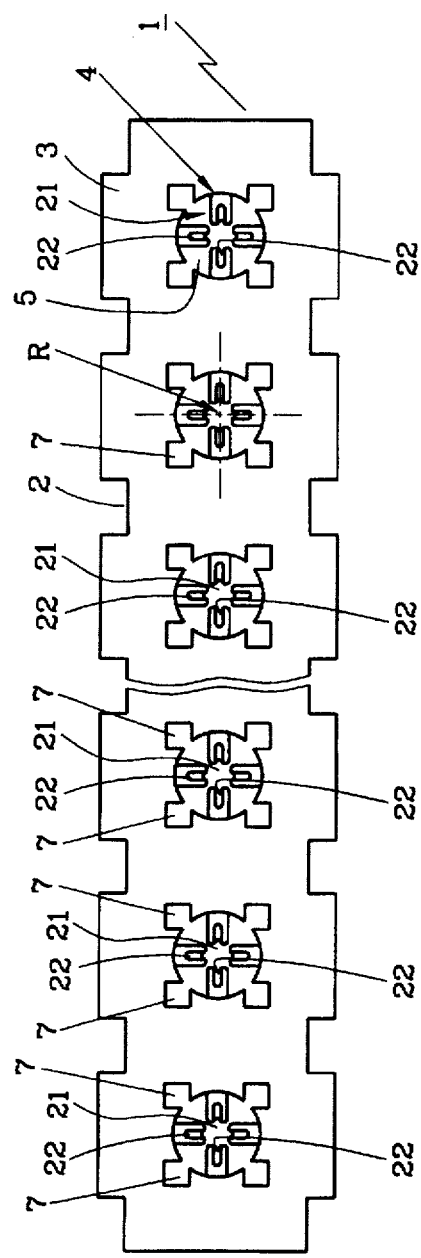
FIG. 8 is an upper view of a second preferred embodiment of as w band in the present invention.
Figure 9:
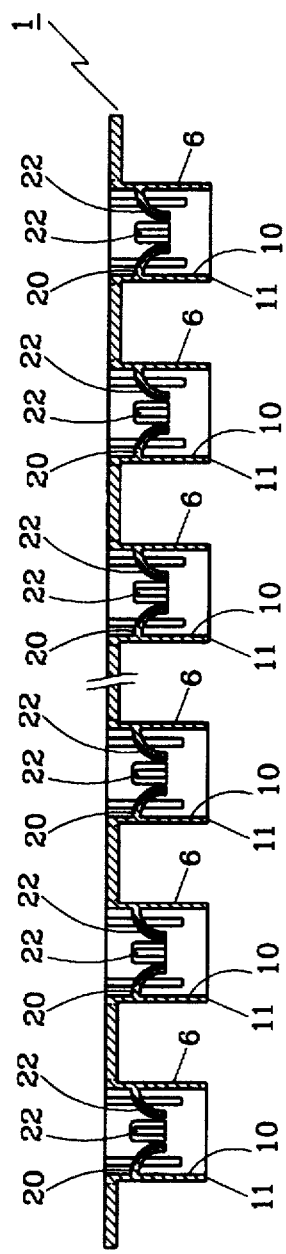
FIG. 9.is a cross-sectional view of the second preferred embodiment of a screw band in the present invention.

A first preferred embodiment of a screw band in the present invention, as shown in FIG. 3, includes a body 1 of any length, a plurality of notches 2 spaced equidistantly in two longitudinal sides and useful for the screw band to be moved by an automatic screw driving tool. The screw band further has a plurality of screw holes 4 bored through an upper surface 3, and each screw hole 4 has a through hole 5 defined by an annular wall 6 extending upright downward and having any shape, plural small notches 7, for example, four notches shown in the figures, extending downward from the annular wall 6 for a screw to be driven smoothly in an object. Further, two or more vanes 8, for example, four vanes shown in the figures, are provided to extend inward from an inner surface of the annular wall 6, having the same or not the same height as the annular wall 6.

As for the vanes 8, they are preferably arranged in a clockwise direction or counter-clockwise so that a screw A may be supported by elasticity produced by the valves 8 when pressed to bend to one side after the screw A is planted in a screw hole 4. The screw A can be securely clamped by the vanes 8 all together after it is positioned in a screw hole 4. The vanes 8 may be in a contact-with-each-other condition or in a non-contact-with-each-other condition shown in FIG. 6, depending upon a curved-inward depth of each vanes 8. Therefore, the screw band can be used for screws A of different diameters. In addition, screws carried in the screw band can be swiftly pushed out of the screw band by an automatic screw driving tool, because each screw is elastically clamped by the vanes 8 in the annular wall of each screw hole 4.

The vanes 8 in the annular wall of each screw hole 4 may have an upper end surface 9 sloped down or curved down in the annular wall 6 of each screw hole 4 so as to form a cone-shaped space to permit a screw A pass through the screw hole 4 with less resistance than should be, and be supported at its neck Al by the cone-shaped opening, with the screw being kept in an upright condition relative to the screw band.

Figure 10:
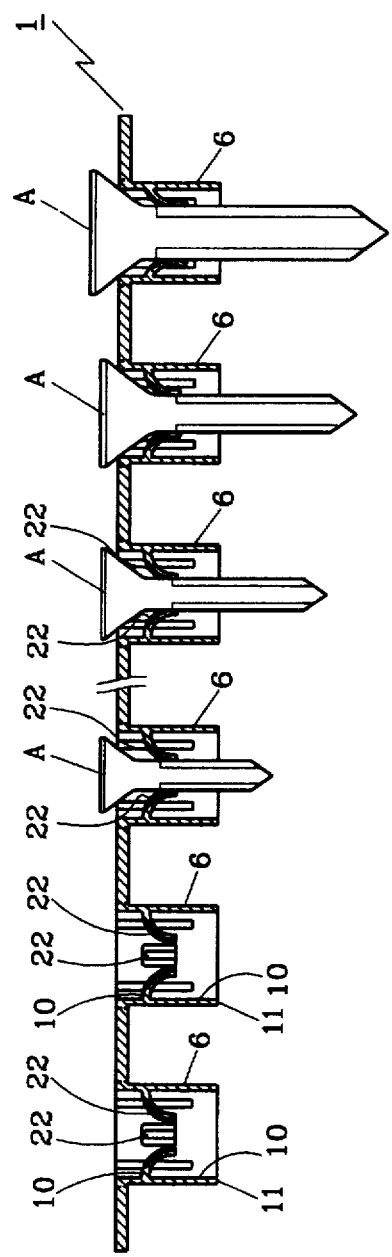
FIG. 10 is a cross-sectional view of the second preferred embodiment of a screw band in the present invention, carrying screws of different diameters.
Figure 11:
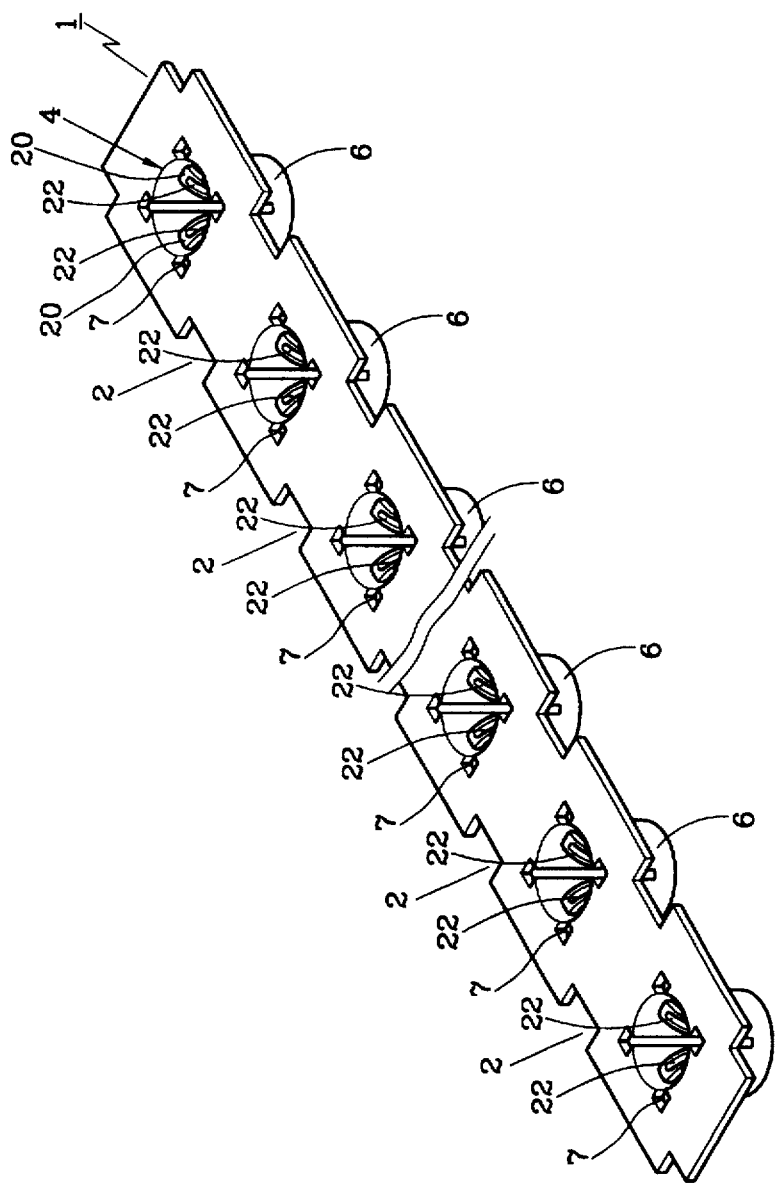
FIG. 11 is a perspective view of the second preferred embodiment of a screw band in the present invention.

A second preferred embodiment of a screw band in the present invention, as shown in FIGS. 8–11, has the same body 1 as the first preferred embodiment, but two or more vanes 20 extending down from an inner surface of an annular wall 10 of the screw hole and having the same height as the annular wall 10 or a different height from the annular wall 10. The vanes 20 extend down vertically or not vertically to the center R of the screw hole, arranged either in an balanced or unbalanced condition, forming a clamp space 21 for a screw A to be inserted and clamped therein. The clamp space 21 may change in accordance with different diameter of a screw A so as to firmly support the screw A planted therein, as shown in FIG. 10.

Elasticity of the vanes to bend downward can alter the diameter of the clamp space 21 so that a screw A inserted therein may be firmly supported by the valves. After a screw A is inserted in the clamp space 21, the vanes commonly clamp and support the screw A to let it stay in place securely so that the screw band of the invention may permit screws of different diameters to be planted therein. Thus, screws A kept elastically in the screw band can be pushed out quickly by an automatic screw driving tool.

Each vanes in the invention may be provided with a small groove 22 in a front end to closely contact with a screw A so as to support it more securely than otherwise, and screws A may be supported in a vertical condition in a screw band and more accurately rotated by an automatic screw driving tool.

A third preferred embodiment of a screw band according to the invention is shown in FIGS. 12 and 13, having the same body 1 as the second preferred embodiment, except vanes 30 extending upward from a bottom 11 of an annular wall and then curving to form a curved surface 31 and having a small groove 32 in a front end. Then a clamp space 33 defined by the vanes 30 has the same advantage as that of the first preferred embodiment, i.e. expansible to suit to different diameters of screws A so that screws of different diameters may be planted in the screw band and kept in an upright condition.

Figure 14:
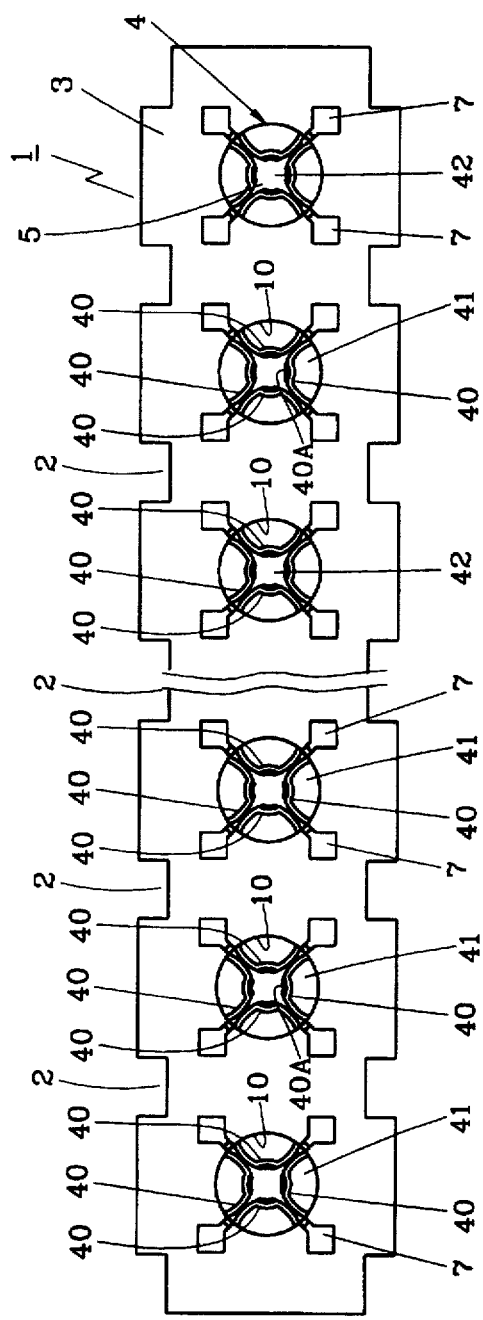
FIG. 14 is an upper view of a fourth preferred embodiment of a screw band in the present invention.
Figure 15:
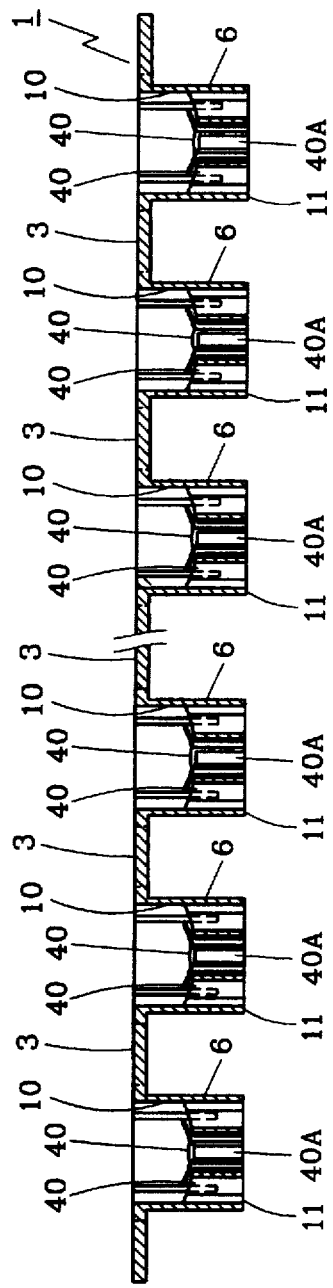
FIG. 15 is a cross-sectional view of the fourth preferred embodiment of a screw band in the present invention.
Figure 16:
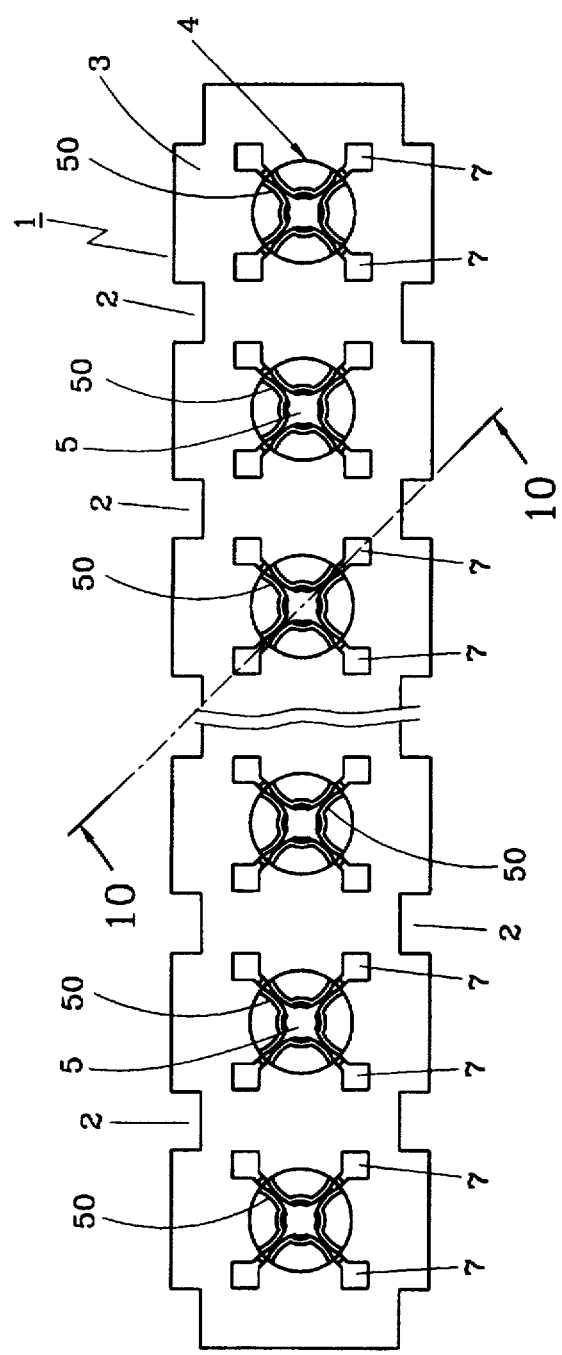
FIG. 16 is an upper view of a fifth preferred embodiment of a screw band in the present invention.
Figure 17:
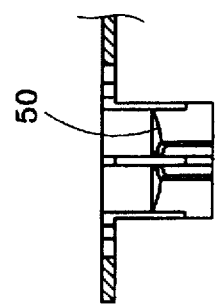
FIG. 17 is a cross-sectional view of line 10—10 in FIG. 16.
Figure 18:
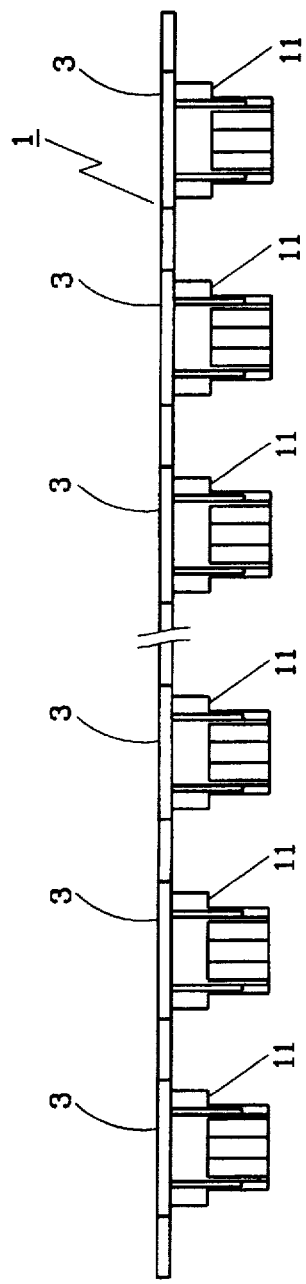
FIG. 18 is a side view of the fifth preferred embodiment of a screw band in the present invention; and, FIG. 19 is a perspective view of the fifth preferred embodiment of a screw band in the present invention.
Figure 19:
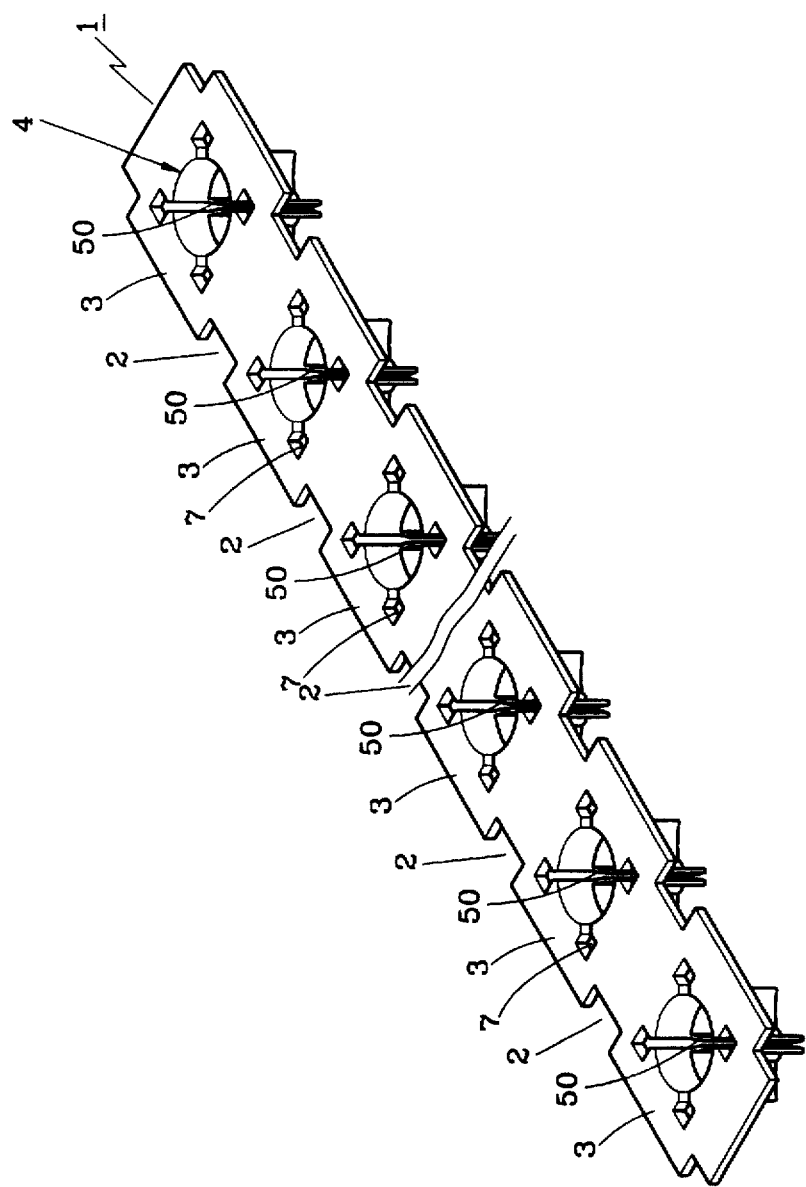

A fourth preferred embodiment of a screw band according to the invention is shown in FIGS. 14 and 15, having the same body 1 as the first preferred embodiment, except vanes 40 located spaced apart in the annular wall 10 and respectively having a curved shape and formed the vacant space 41 and small groove 40A in a front end, defining a clamp space 42 in the annular wall expansible to alter the diameter of the clamp space 42 to suit to the diameter of various screws to be planted therein.

A fifth preferred embodiment of a screw band according to the invention is shown in FIGS. 16–19, having the same body 1 as the first preferred embodiment, except vanes 50 having the same curved shape as the fourth preferred embodiment but different from the fourth one in that the vanes 50 extending down inward from the bottom 11 of the annular wall. Then the vanes 50 have the same function as those in the other preferred embodiments.

The plural vanes of all the preferred embodiments of the invention have a common function that a clamp space defined by the vanes for screws of different diameters to be planted and clamped elastically by them. While the preferred embodiment of the invention has been described above, it will be recognized and understood that various modifications may be made therein and the appended claims are intended to cover all such modifications which may fall within the spirit and scope of the invention.

What is claimed is:

1. A screw band comprising:

a body of any length, a plurality of notches provided in two longitudinal sides so that said screw band is moved by an automatic screw driver, a plurality of screw holes in a center portion of said body, each said screw hole includes a through hole defined by an annular wall extending downward from said body to form a screw supporting portion, said annular wall includes a plurality of notches; wherein said annular wall further includes a plurality of vanes extending from a bottom of said annular wall to a center thereof and continuing upward to form a curved surface with a groove in a front end thereof, said vanes define a clamp space a diameter of which is altered in accordance with a diameter of a screw to be inserted in said screw hole so as to support said screw securely therein.

2. A screw band comprising:

a body of any length, a plurality of notches provided in two longitudinal sides so that said screw band is moved by an automatic screw driver, a plurality of screw holes in a center portion of said body, each said screw hole includes a through hole defined by an annular wall extending downward from said body to form a screw supporting portion, said annular wall includes a plurality of notches; wherein said annular wall further includes a plurality of curved vanes extending from an inner surface of said annular wall to a center thereof, each said vane includes a groove in a front end thereof, said vanes define a clamp space to receive and secure therein screws of varying diameters.

3. The screw band as claimed in claim 2 wherein:

a space is defined between said vanes and said inner surface of said annular wall so as to allow said vanes to bend.

4. The screw band as claimed in claim 2 wherein:

said vanes extend and bend inward from a bottom of said annular wall.

* * * * *